(12) United States Patent
Yu

(10) Patent No.: US 7,614,891 B2
(45) Date of Patent: Nov. 10, 2009

(54) CARD CONNECTOR

(75) Inventor: Hung-Chi Yu, Tu-cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/286,356

(22) Filed: Sep. 29, 2008

(65) Prior Publication Data

US 2009/0093147 A1 Apr. 9, 2009

(30) Foreign Application Priority Data

Oct. 8, 2007 (TW) .................................. 96137647

(51) Int. Cl.
*H01R 13/62* (2006.01)

(52) U.S. Cl. ...................................... 439/159; 439/630

(58) Field of Classification Search .................. 439/159, 439/607, 630
See application file for complete search history.

(56) References Cited

U.S. PATENT DOCUMENTS

| 6,123,560 | A | * | 9/2000 | Hara et al. ................... 439/159 |
| 6,142,801 | A | * | 11/2000 | Koseki et al. ................ 439/159 |
| 6,162,075 | A | * | 12/2000 | Hara et al. ................... 439/159 |
| 6,508,402 | B1 | | 1/2003 | Takada |
| 6,520,784 | B2 | * | 2/2003 | Ito et al. ...................... 439/159 |
| 6,619,971 | B1 | * | 9/2003 | Chen ........................... 439/159 |
| 6,669,493 | B2 | * | 12/2003 | Kuroda ........................ 439/159 |
| 6,962,500 | B1 | | 11/2005 | Chen |
| 7,175,452 | B1 | * | 2/2007 | Lin et al. ..................... 439/159 |

\* cited by examiner

*Primary Examiner*—Thanh-Tam T Le
(74) *Attorney, Agent, or Firm*—Andrew C. Cheng; Wei Te Chung; Ming Chieh Chang

(57) ABSTRACT

A card connector (1) for receiving or ejecting a card includes an insulating body (4) retaining a plurality of terminals, a shell (2) covering the insulating body to define a card slot (10), an ejector (2) mounted on a lateral side of the shell. The ejector includes an ejecting member (51) for engaging with the card and removing with the card and an operating member (52) adapted to promote the ejecting member. The operating member includes a base (521) having a circular groove (5211), a slider (522), a pushing bar (523), and an elastic member (524). The circular groove generally defines two opposite channels with different length, and the two opposite channels diverge forwardly and extending backwardly in a crossed direction to meet each other then extending horizontally to form a horizontal groove (5212) for locking the slider under a careless attitude.

9 Claims, 6 Drawing Sheets

CARD CONNECTOR

BACKGROUND OF THE INVENTION

1. Field of the Invention

The present invention relates to a card connector, and more particularly to a card connector having an ejector for moving a card towards an ejecting direction.

2. Description of Prior Arts

Recently, card-in operation type electronic devices have rapidly prevailed in which a user-owned IC card is inserted, when necessity arises, into a give electronic device such as a camera, a personal computer, a recording machine or the like so that information from such an electronic device is recorded in the IC card or information from the IC card is given to such an electronic device.

In the conventional art, as means for withdrawing or ejecting a memory card inserted in a card-in operation type electronic device, the depth dimension of insertion of the memory card is set such that a rear end of the card projects from a card inlet port when the memory is inserted, thereby allowing the user to withdraw the projected rear end using his fingers. However, such arrangement for withdrawing the memory card by pinching the projected end with the user's fingers requires an appropriate amount of projection of the card to allow the user to pinch the card with his fingers. This projection badly spoils an outer appearance of the device. Also, chances are increased for damaging the card by external shock or impact. In addition, the individual user should withdraw the memory card, which is frictionally contacted with contact, in an abnormal attitude, the card would likely be damaged or a large load would be required for the user to withdraw the memory card.

One approach to resolve the problem is to apply a special ejector in a card connector of the card-in operation type electronic device. Such ejector has an eject button disposed at an area in the vicinity of the card inlet port so that the user can push this eject button after use in order to actuate an ejecting lever of the ejector for ejection of the card (releasing of the card).

As shown in FIG. 6, an ejector operated by pushing an eject button is disclosed. The ejector has a pushing bar 610 with an eject button for user take an actuating action, a base 611 with a guiding groove 6110, a slider 612 coupling with the pushing bar 610 and with a protrusion moving in the guiding groove 6110, an operating bar 620 and an ejecting section (not shown) for engaging with a card directly. When the card is received in the card connector completely, the slider 612 is desired to locate at a locking position where the pushing bar 610 generally has no portion disposed out of the card connector, and when the card is ejected, pushing the eject button of the pushing bar 610 forwardly to make the slider move backwardly to a releasing position where the ejecting bar has a long portion projecting out of the card connector, then pushing the eject button again, the slider moving forwardly to the locking position together with the operating bar 611 moving forwardly and the operating bar forced to move backwardly to eject the card.

However, this design also possesses a shortcoming. As described above, when the card is ejected and no card in the card connector, the pushing bar is moved forwardly and only has a short portion disposed out of the card connector. If the pushing bar is operated by a user carelessly, the pushing bar will protrude outwardly and has a long portion disposed out of the card connector. There, chances will occur to damage the pushing bar by a user impact or other external devices. Furthermore, the long protrusion of the pushing bar take a large room and damage an entire speciously appearance of the card connector.

Therefore, the present invention is directed to solving the problem by providing a card connector which has a new and improved ejector.

SUMMARY OF THE INVENTION

An object, therefore, of the invention is to provide a card connector having an ejector capable of avoiding an interference by external device and allowing a card to be located in a desirable position.

In the exemplary embodiment of the invention, a card connector for receiving or ejecting a card includes an insulating body retaining a plurality of terminals, a shell covering the insulating body to define a card slot, an ejector mounted on a lateral side of the shell. The ejector includes an ejecting member for engaging with the card and removing with the card and an operating member adapted to actuate the ejecting member. The operating member includes a base having a circular groove, a slider, a pushing bar, and an elastic member. The circular groove generally defines two opposite channels with different length, and the two opposite channels diverge forwardly and extending backwardly in a crossed direction to meet each other then extending horizontally to form a horizontal groove adapted to lock the slider under a careless attitude when no card in the card connector.

Other objects, advantages and novel features of the invention will become more apparent from the following detailed description of the present embodiment when taken in conjunction with the accompanying drawings.

DETAILED DESCRIPTION OF THE PREFERRED EMBODIMENT

Figure 1:
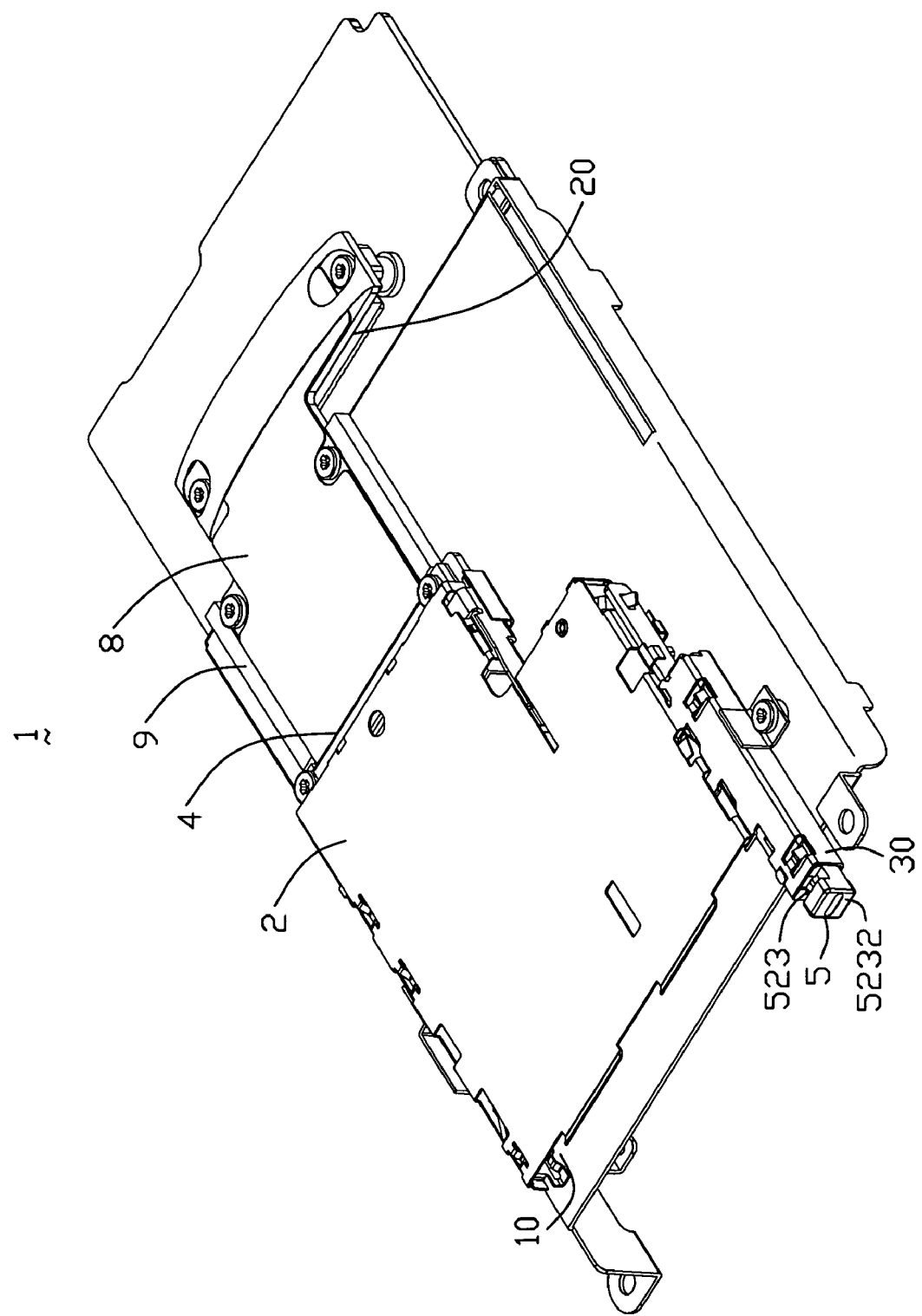
FIG. 1 is a perspective view of a card connector of present invention.
Figure 2:
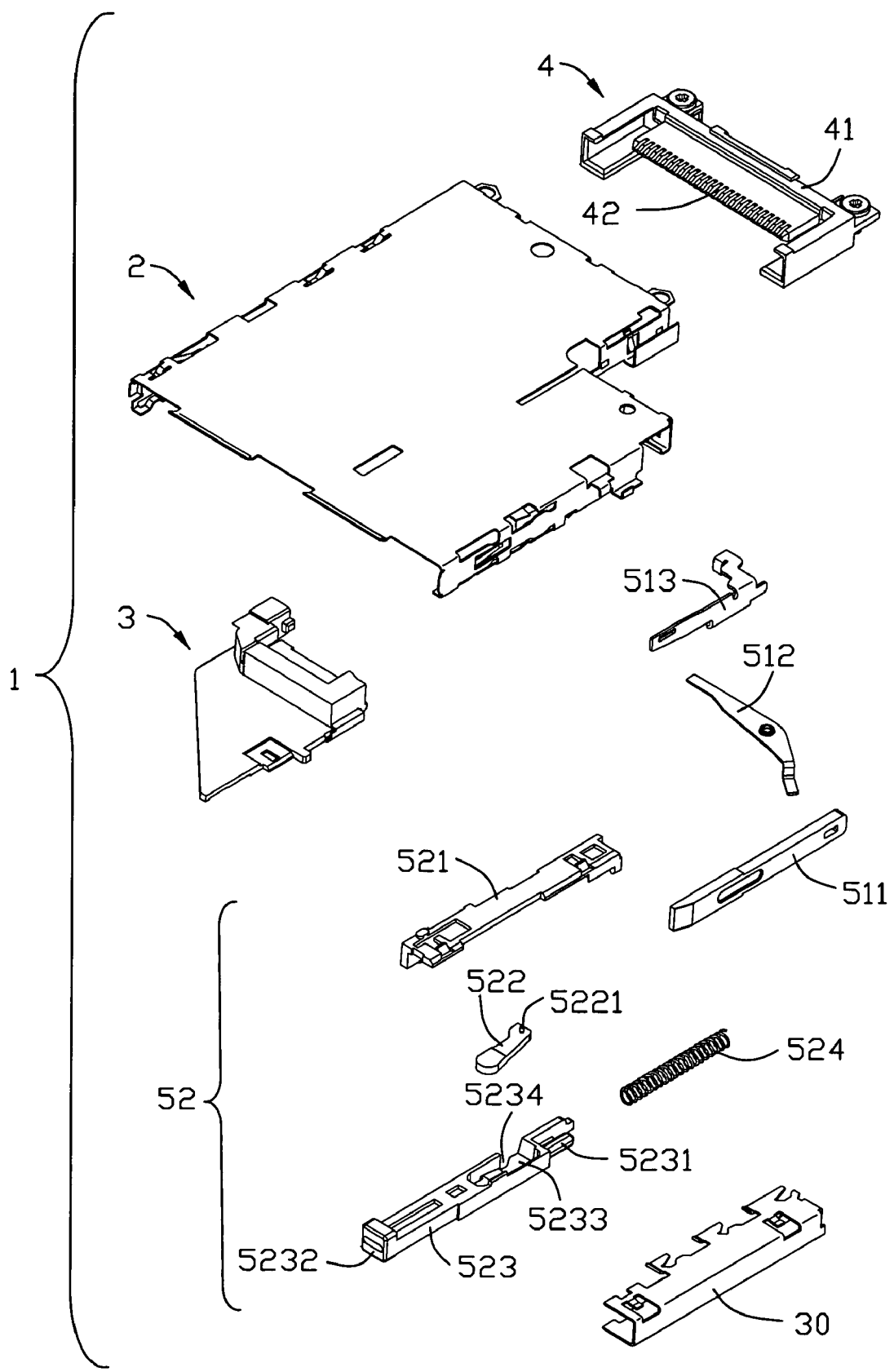
FIG. 2 is an exploded view of the card connector of present invention.

In refer to FIG. 1 to FIG. 4, the present invention provides a card connector 1 used for receiving or ejecting a card (not shown) along an inserting or a removing direction. The card connector 1 comprises an insulating body 4 accommodating a plurality of terminals (not labeled), a shell 2 mounted on the insulating body 4 to define a card slot 10, a guiding plate 3 residing within the card slot 10 and an ejector 5 disposed at a lateral side of the shell 2. In a preferred embodiment, the guiding device 3 extends in the card slot in a particular direction intersecting the inserting direction.

The shell 2 is stamped by a metal plate, and one end thereof couples with the insulating body 4, the other end opposite to the insulating body defines a card-in port (not labeled) for a card inserting or ejecting.

The insulating body 4 has a base 41 and a terminal-in section 42 extending backwardly from the base 41. In this preferable embodiment of present invention, a Flexible Printed Circuit 8 is provided, and one rear end of the Flexible Printed Circuit 8 connects with the insulating body 4, and the other end thereof is used for joining with an electronic device to serve as a media device between a card in the card connector and the electronic device. A holding plate 9 is provided under the Flexible Printed Circuit 8 adapted to make the Flexible Printed Circuit 8 have a proper high.

Figure 3:
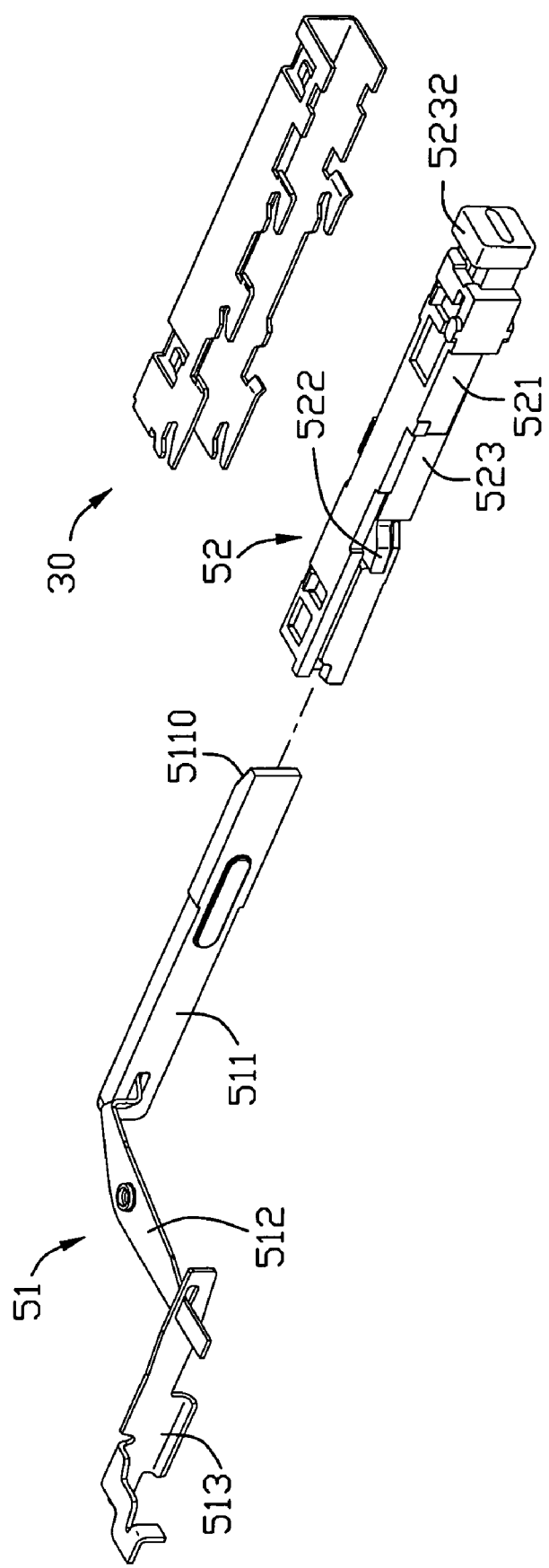
FIG. 3 is an exploded view of an ejector and a bracket of the card connector of present invention.
Figure 4:
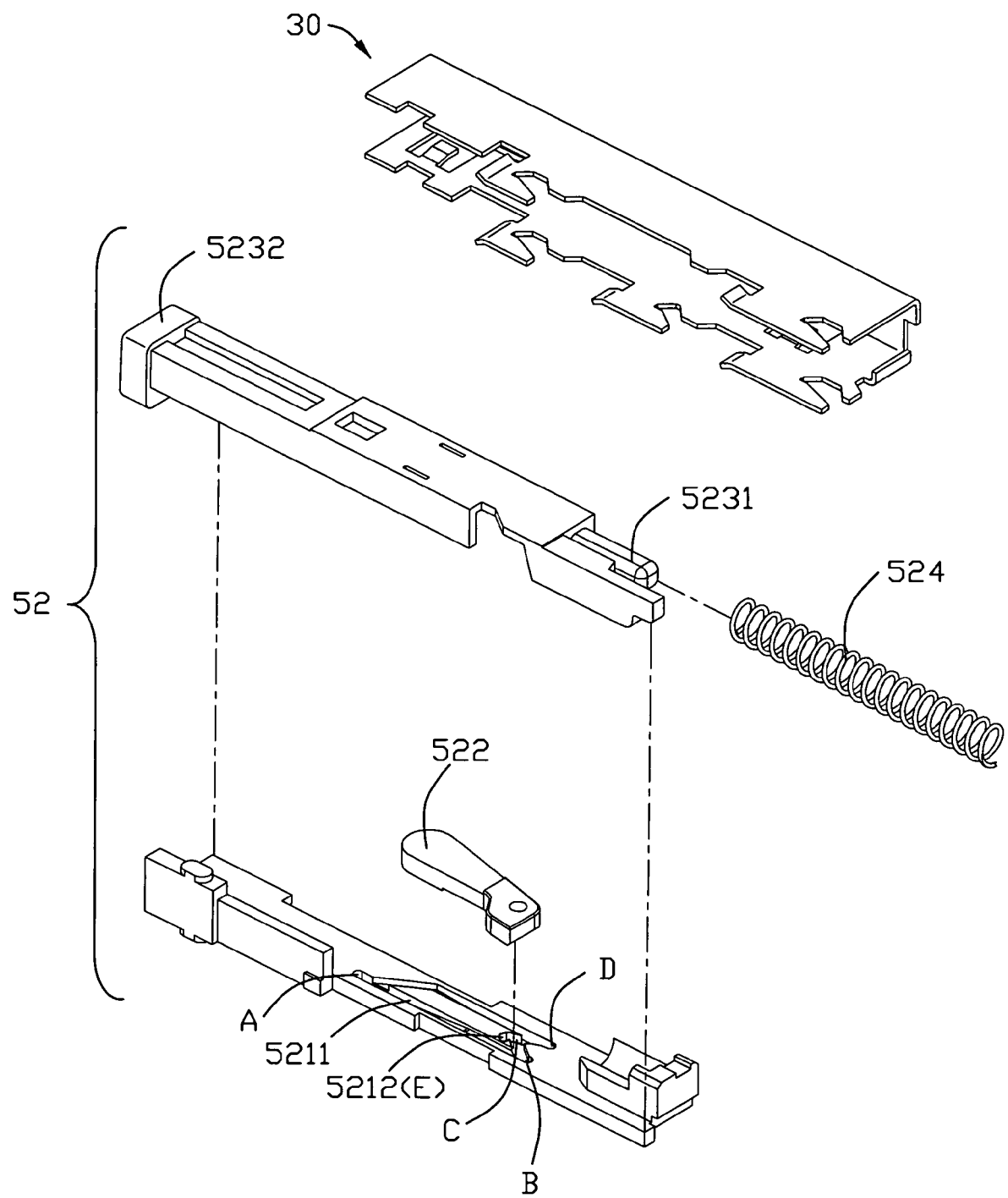
FIG. 4 is an exploded view of a pushing device of the ejector and a perspective view of the bracket as shown in FIG. 3.

As shown in FIG. 1 and FIG. 3, the ejector 5 is fixed on a lateral side of the shell 2 by a bracket 30 for removing a card in the card slot 10 towards the removing direction. The ejector 5 has an ejecting member 51 to engage with the card in the card slot 10 and moving together with the card, and an operating member 52 for moving the ejecting member 51 towards the removing direction after a pushing action. The ejecting member 51 comprises a passive bar 511, an ejecting bar 513 to engage with a card in the card slot 10 directly and a transmitting bar 512 to transmit operation of the passive bar 511 to the ejecting bar 513. A bevel interface 5110 is disposed on a head of the transmitting bar 511 to intervene with the operating member 52. The operating member 52 has a base 521 with a circular groove 5211, a slider 522 with a pole 5221 capable of moving in the circular groove 5221, a pushing bar 523 for a user driving and an elastic member 524 adapted to promote the pushing bar 523 to an original position.

The base 521 and the pushing bar 523 are substantially of longitudinal shape and couple with each other mainly by the slider 522. The circular groove 5211 of the base 521 is generally of a heart shape and has two opposite Channels (not labeled) with different length. The two opposite channels diverge forwardly and extend backwardly in a crossed direction to meet each other then extend horizontally to form a horizontal groove 5212. The horizontal groove 5212 communicates with the circular groove 5211 and extends to the card slot 10 in a horizontal direction perpendicular to the inserting direction of the card. In the circular groove 5211, there are five ports A, B, C, D and E in order to the pole 5221 of the slider 522 settle, the port A served as an original position, B and D defined at the inner leader of the circular groove 5211, C defined at the entrance to the horizontal groove 5212 and port E located in the dead end of the horizontal groove 5212. The pushing bar 523 has two opposite ends, one end as a button adapted to be operated by a user and the other end having a post 5231 for locking with the elastic section 524. Furthermore, between the two ends of the pushing bar 523, there is a receiving room 5233 for the slider residing within and a cut portion 5234 for the slider projecting therefrom to the card slot 10. As a result of the five ports A, B, C, D and E, the slider 522 will have six journeys in the circular groove 5211 during the card ejection, in turn, E-C, C-D, D-A, A-B, B-C, C-E.

In a free statement and no card in the card slot, the pole 5221 of the slider 522 is located at the port A or an original position of the circular groove 5211, the slider 522 partially invades into the card slot 10 and the pushing bar 523 has a long portion disposed out of the bracket 30. Driving the pushing bar 523 forwardly to make the pole 5221 of the slider 522 slid at the port B along the longer channel, then the passive bar 511 of the ejecting member 51 is promoted by the slider 522 and moves forwardly. At the same time, the elastic section 524 is pressed and tends to expand to actuate the slider 522 moving backwardly to the port C or a resumption position as shown in a first drawing of FIG. 5 from left to right, and continuously to the port E or a locking position along the horizontal channel 5212, there, the slider 522 separated with the passive section 511 and passing through the cut portion 5234 into the card slot 10, the pushing bar received in the bracket 30. With the horizontal channel 5212 resisting, the slider 522 can not get back to the original port A, even though a drive action is forced on the pushing bar 523. Accordingly, it is impossible for the pushing bar 523 to protrude from the bracket and be damaged by a careless action.

Figure 5:
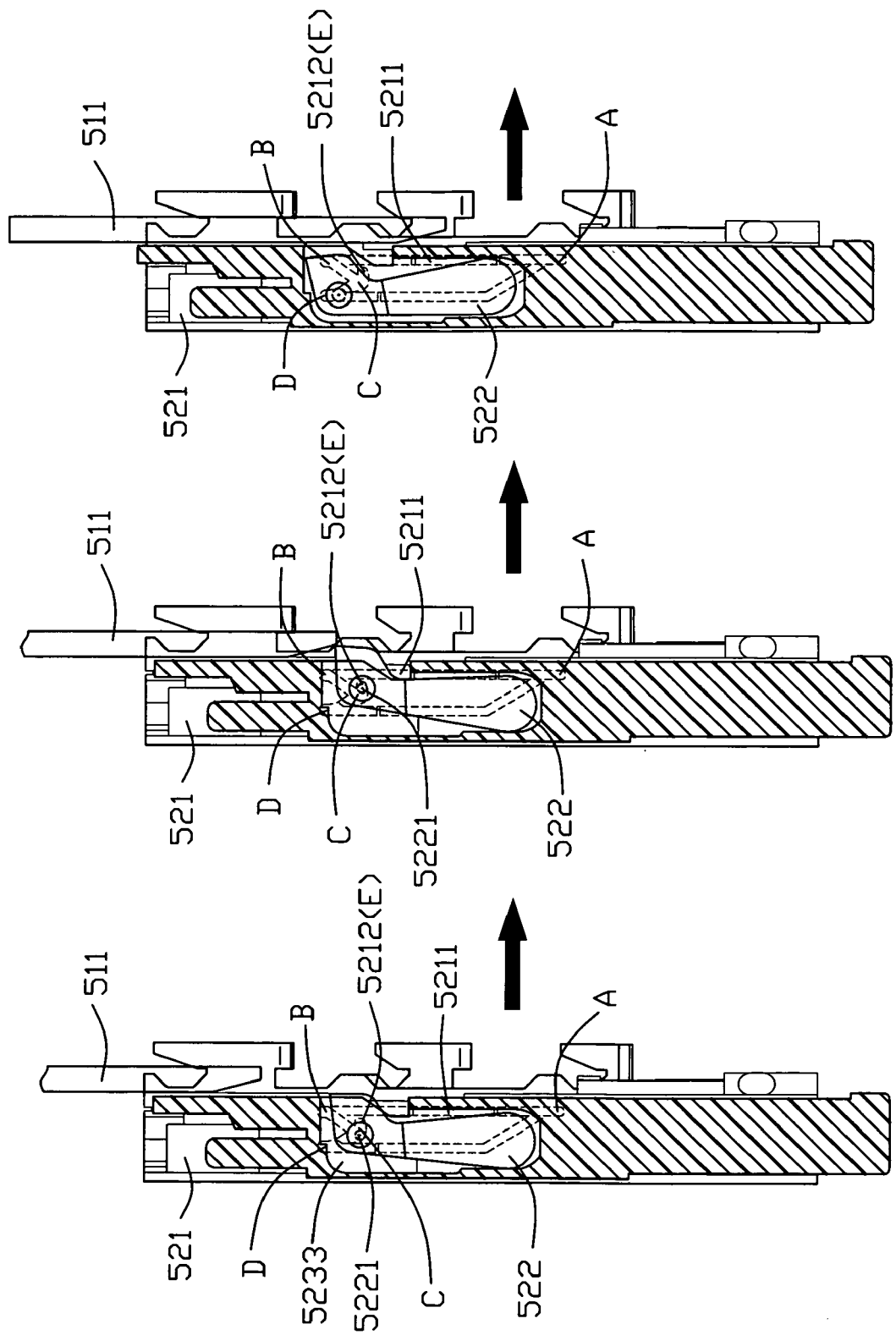
FIG. 5 is partially views of the ejector with a slider located therein at different position when a card is inserted.
Figure 6:
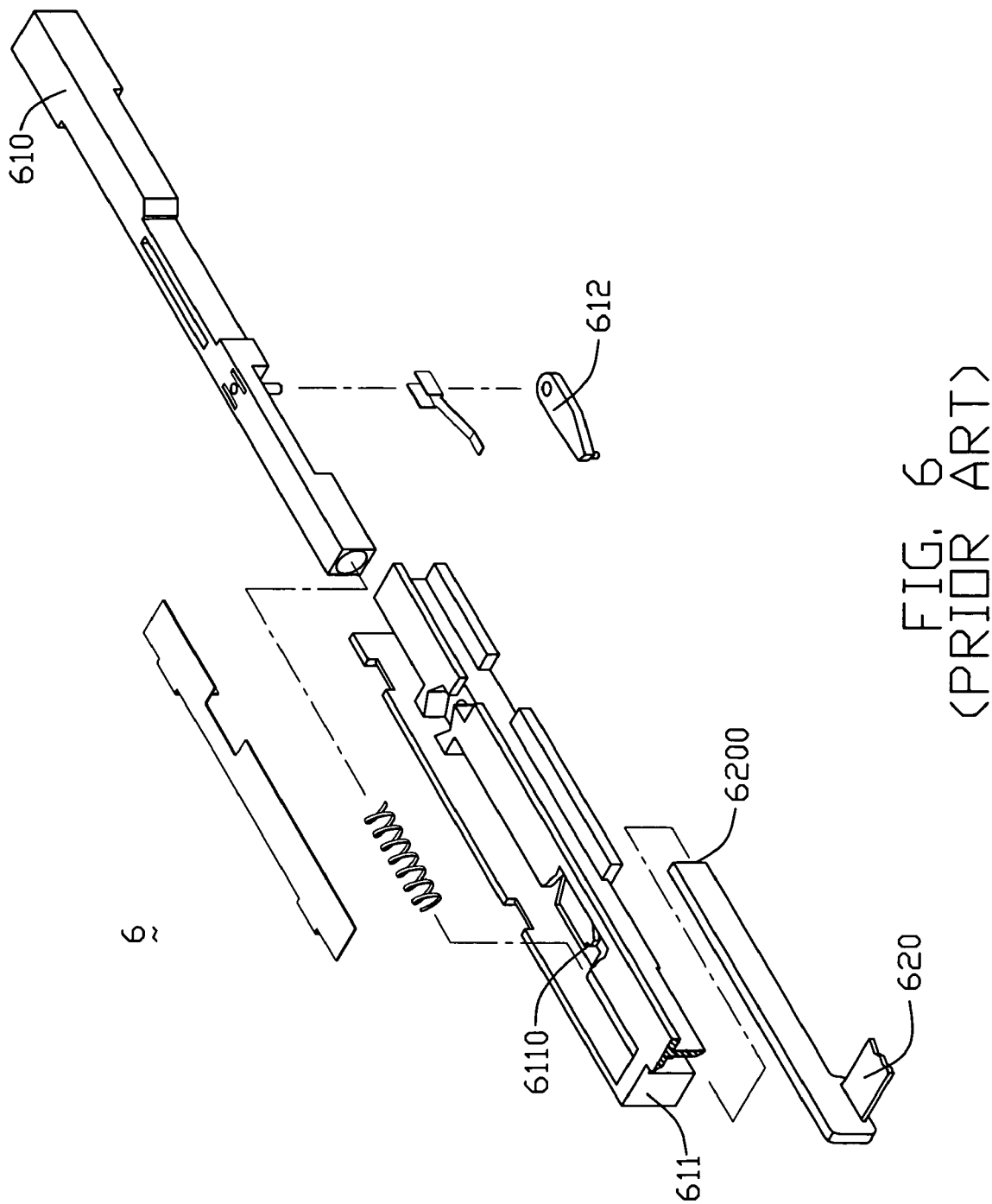
FIG. 6 is an exploded view of a prior ejector used in a card connector.

FIG. 5 shows three main position of the pole 5221 of the slider 522 in the groove 5211. From left to right, the first drawing is a view of when the pole 5221 locates at the port C and tends to in the port E, the second shows when the card is inserted, the passive section 511 is driven toward the removing direction of the card to lean against the slider 522 and make the pole 5221 displace from the port E to the port C, and the third shows when a pushing action on the pushing bar 523, the pole 5221 removes form the port C to the port D.

Continuously as shown in FIG. 5 together with FIG. 3, a detailed description of the card ejection will be illustrated. When the card is inserted into the card slot 10, the ejecting bar 513 is pushed forwardly together with the passive bar 511 move backwardly till the passive bar 511 lean against the slider 522 gradually, as shown in a second drawing of FIG. 5 from left to right. Then the slider 522 is forced to the port C due to an outwardly force from the bevel interface 5110 of the passive bar 511. When the card is ejected, driving the pushing bar 523 forwardly, the slider 522 removes to the port D continuously to the port A along the shorter channel by a pushing action of the elastic section 524, there, the pushing bar 523 having a long portion disposed out of the bracket 30. Promoting the pushing bar 523 again, the slider 522 arrives to the port C along the longer channel as show in the first drawing of FIG. 5 taken from left to right, continuously to the port E following the same manner as described above. Then the ejecting bar 513 moves forwardly, correspondingly, the card is ejected, and the pushing bar 523 is received in the bracket 30 again.

After such an ejection action, no card in the card connector and the slider 522 gets back to the port E together with the pushing bar 523 residing within the bracket 30. The port E can be defined as a lock port, there, the pole 5221 of the slider 522 is forced in the horizontal channel 5212 of the base 521, if without an insertion action of the card, and can not remove away from thereof. Even though a careless pushing action is on the pushing bar 523, the slider 522 can not leave the port E to the port C to slide in the long channel or the short channel. Because the slider 522 is locked in the horizontal channel 5212 and can not release therefrom. Thus the pushing bar 523 only has a short protrusion disposed out of the card connector, no matter a careless attitude on the pushing bar. Of course, there is no chance to impact the pushing bar 523 by the use or other external devices. More particularly, the pushing bar 523 can not be damaged, at the same time, do not need to take the external space of the card connector, synchronously, an entire speciously appearance of the card connector is achieved.

The primary purpose of the present invention is to provide a horizontal channel 5212 communicating with the long channel and the short channel of the base 521 to lock the slider 522 in the lock port E of the horizontal channel 5212 when no card in the card connector, and when the card is inserted, the card presses the slider 522 outwardly to release from the lock port E to the port C, preparative to get to the original position A and slide in the long channel or the short channel to eject the card as described above. Particularly, in a preferred embodiment, the horizontal channel 5212 has a length equal to that of the part of the slider 522 invading into the card slot 10, in order to get a more accurate press action of the slider and to reduce the entire width of the base.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A card connector for receiving or ejecting a card along an inserting or removing direction opposite to the inserting direction, comprising:

an insulating body retaining a plurality of terminals;
   a shell covering the insulating body to define a card slot adapted to receive the card; and
   an ejector mounted on a lateral side of the shell, comprising:
      an ejecting member for engaging with the card; and
      an operating member operable to move the ejecting member towards the removing direction and comprising a base having a substantially heart-shape groove, a slider capable of moving in the groove together with the card removing, a pushing bar, and an elastic member for urging the pushing bar to an original position, the groove defining two opposite channels, the two opposite channels diverging forwardly and extending backwardly in a crossed direction to meet each other then extending horizontally to form a horizontal groove;
   wherein the horizontal groove communicates with the substantially heart-shape groove of the operating member and extends toward the card slot in a horizontal direction perpendicular to the inserting direction;
   wherein the ejecting member comprises an ejecting bar adapted to engage with the card, a passive bar having a bevel interface to intervene with the slider of the operating member, and a transmitting bar to transmit operation of the passive bar to the ejecting bar;
   wherein when no card in the card slot, the slider locates in the horizontal groove and projects into the card slot, and the passive bar of the ejecting member is separated with the slider; and
   wherein when the card is inserted, the ejecting bar is promoted by the card to move toward the card inserting direction, and the passive bar moves toward the removing direction to lean against the slider and make the slider displace from the horizontal groove to the channels of the substantially heart-shape groove.

2. The card connector as claimed in claim 1, wherein when the slider locates in the horizontal groove, the slider projects from the base into the card slot.

3. The card connector as claimed in claim 2, wherein the horizontal groove has a length equal to that of the part of the slider projecting into the card slot.

4. The card connector as claimed in claim 1, wherein the pushing bar and the base couple with each other by the slider.

5. The card connector as claimed in claim 4, wherein the pushing bar has a receiving room adapted to receive the slider and a cut portion allowing the slider to pass through, and the slider has a pole to remove in the groove of the base.

6. The card connector as claimed in claim 1, wherein the pushing bar comprises a post to lock with the elastic device.

7. The card connector as claimed in claim 1, wherein the ejector further comprises a bracket assembling the base, the slider and the pushing bar together.

8. The card connector as claimed in claim 1, further comprising a guiding plate residing within the card slot and extending in the card slot in a special direction crossed the inserting direction.

9. The card connector as claimed in claim 1, wherein the two opposite channels have different length.

* * * * *